United States Patent [19]
Kumar et al.

[11] Patent Number: 5,992,950
[45] Date of Patent: Nov. 30, 1999

[54] CONTROLLED STOP FUNCTION FOR LOCOMOTIVES

[75] Inventors: Ajith Kuttannair Kumar, Erie; Bret Dwayne Worden, Union City, both of Pa.

[73] Assignee: General Electric Company, Erie, Pa.

[21] Appl. No.: 09/050,295

[22] Filed: Mar. 30, 1998

[51] Int. Cl.⁶ .............................. B60K 1/00; H02P 3/14; B61C 3/00
[52] U.S. Cl. ..................... 303/151; 303/20; 318/375; 318/376; 324/677; 290/3
[58] Field of Search ................ 322/16, 37; 361/18; 363/50, 124; 318/153, 154, 362, 375, 376; 338/279, 281, 283, 295; 290/3, 9, 45

[56] References Cited

U.S. PATENT DOCUMENTS

| | | | |
|---|---|---|---|
| 3,866,702 | 2/1975 | Eastman | 180/65.2 |
| 3,890,551 | 6/1975 | Plunkett | 318/376 |
| 4,075,538 | 2/1978 | Plunkett | 318/52 |
| 4,093,900 | 6/1978 | Plunkett | 318/370 |
| 4,444,285 | 4/1984 | Stewart et al. | 180/65.4 |
| 5,057,987 | 10/1991 | Kumar et al. | 363/58 |
| 5,170,105 | 12/1992 | Kumar | 318/362 |
| 5,208,741 | 5/1993 | Kumar | 363/124 |
| 5,245,294 | 9/1993 | Kumar | 324/677 |
| 5,323,095 | 6/1994 | Kumar | 318/376 |
| 5,331,261 | 7/1994 | Brown et al. | 318/376 |
| 5,436,540 | 7/1995 | Kumar | 318/375 |
| 5,480,220 | 1/1996 | Kumar | 303/151 |
| 5,629,567 | 5/1997 | Kumar | 290/3 |
| 5,646,510 | 7/1997 | Kumar | 322/16 |
| 5,691,625 | 11/1997 | Kumar et al. | 322/20 |
| 5,721,479 | 2/1998 | Kumar et al. | 318/801 |
| 5,929,610 | 7/1999 | Friedlander et al. | 322/37 |

*Primary Examiner*—Chris Schwartz
*Attorney, Agent, or Firm*—Jill M. Breedlove; Marvin Snyder

[57] ABSTRACT

A controlled stop system for an AC electric locomotive includes a braking effort control circuit responsive to a braking command regulating braking effort produced by AC traction motors coupled in driving relationship to wheels of the locomotive. The control circuit is responsive to a vehicle speed signal for adjusting motor operation to maintain braking effort to about zero speed. A filter processes the speed signal before application to the braking effort control circuit such that the control circuit operates as a speed regulator at zero speed to maintain the vehicle in a stopped condition.

11 Claims, 3 Drawing Sheets

# CONTROLLED STOP FUNCTION FOR LOCOMOTIVES

BACKGROUND OF THE INVENTION

The present invention relates to electrical braking systems for alternating current electric traction motors used in electrically propelled vehicles and, more particularly, to a braking effort control which can be used to hold a vehicle in a stopped position.

Electrical braking is used in various electrically propelled vehicles to supplement and reduce reliance on mechanical friction brake systems. Electric traction motor propelled vehicles such as locomotives, transit cars and off-highway vehicles are typically equipped with electrical retarding or braking systems. Such systems are designed to use the traction motors coupled in driving relationship with wheels of the vehicle in a power generation mode in which the rotation of the wheels drives the motors which are so energized as to act as electric generators. The power produced by the motors is often dissipated in high power resistors, generally referred to as a dynamic braking grid, with the magnitude of power being proportional to braking effort for any given speed.

An electric propulsion system for a traction vehicle, such as a locomotive, typically comprises a prime mover-driven synchronous electric generator or alternator for supplying electric power to a plurality of high horsepower electric traction motors respectively connected in driving relationship to the wheel/axle sets of the vehicle. The prime mover is commonly a diesel engine, and the traction motors are generally adjustable speed, reversible alternating current (AC) electric motors. A vehicle operator controls the vehicle speed and direction of travel, i.e., forward or reverse, by positioning of a speed control selector in one of a plurality of notch positions. This speed control selector is adapted to set motor power to establish a desired vehicle speed.

A typical AC electric motor propelled locomotive includes a rectifier circuit coupled to receive AC power from the alternator for converting it to DC power on a DC link. A DC to AC inverter is coupled between the DC link and each of the AC traction motors. The inverters can each be controlled to supply power to the respective motors so as to effect rotation of the motor rotors in either a clockwise or counter clockwise direction with corresponding forward or reverse movement of the locomotive. The inverters are typically constructed of a plurality of controllable electric switches such as thyristors (SCR), gate turn-off devices (GTO) and field effect transistors (FET). Each switch is controlled such as in a pulse width modulation (PWM) manner so as to regulate the effective AC frequency and current supplied to the motors.

During electrical braking of the locomotive, the AC motors are operated as generators with their respective rotors being mechanically driven by rotation of the locomotive wheels. The current generated by the motors during dynamic electrical braking is dissipated in dynamic braking grids coupled to the DC link. The magnitude of braking effort is a function of the current or electrical power produced by the motors and can be maintained at some maximum level until locomotive speed falls below a minimum value, typically about 2.5 miles per hour. Below that speed, the rotor rotational speed is not sufficient to maintain full braking effort and such effort is generally tapered toward zero. In some instances, dynamic braking terminates at some positive speed, such as 0.5 miles per hour, although the taper could be extended to about zero speed.

When the level of electrical dynamic braking is reduced, slowing and stopping of the locomotive relies on a conventional air operated mechanical braking system. The mechanical brakes are used not only to stop the locomotive but to hold it in position once stopped. The loading of the mechanical braking system promotes wear and tear and requires frequent maintenance. The air brake system requires time to recharge the reservoir after each brake application in order to again deliver full braking effort. Thus, there are at least two disadvantages to existing traction vehicle braking systems, namely that the level of available electrical braking drops off with reduced vehicle speed and that the mechanical braking system suffers excess wear and stress from extended use and the effect on air brake recharge. Accordingly, it would be advantageous to provide an electrical braking system which can provide sustained braking effort at zero speed. Also, stops are not smooth because of the large reduction in dynamic brake effort at low speed.

SUMMARY OF THE INVENTION

Among the several objects of the present invention may be noted the provision of an electrical braking system which can maintain constant braking effort down to zero speed and the provision of an electrical braking system which can maintain braking effort at zero speed.

The above and other objects and features of the invention will be in part pointed out and otherwise apparent in the description which follows. In general, the invention is disclosed in an electrical control system for a diesel-electric locomotive in which AC electric motors are coupled in driving relationship to at least some of the wheels of the locomotive. The locomotive includes a high horsepower diesel engine coupled for driving a synchronous generator or alternator which produces AC electric power. The alternator power is rectified and supplied to a DC link. For each AC motor, there is provided a three-phase inverter having DC input terminals connected to the DC link and AC output terminals connected to corresponding AC phase input terminals of the associated motor. An electrical dynamic braking grid is coupled by suitable switching means to the DC link for dissipating electrical power produced by the traction motors during electrical braking of the locomotive when the motors are operated as generators. A microprocessor based control system is operatively associated with the engine alternator and inverters for controlling the electric power supplied to the traction motors in response to an operator's command setting a desired speed. The control system also responds to an operator's command for braking by controlling the inverters in a manner to transfer power from the motors to the braking grid. The inverters are conventional three-phase inverters having a plurality of controllable electronic switching devices and are operated in a pulse width modulation mode to apply controlled frequency excitation to the traction motors. During electrical braking, the inverter switches are controlled to allow a reverse power flow.

In the present invention, the inverter switches are operated so as to allow current flow from the motors to the braking resistance grid in a conventional manner. However, as locomotive speed drops, the traction alternator and the inverter switches are operated in a manner to allow the DC link voltage to maintain sufficient motor flux so that the motors continue to produce braking effort. The motor flux may be held at a value which allows substantially constant braking effort to about zero speed. The present invention incorporates a speed regulator function into the vehicle braking effort control system with the speed regulator operative to effect braking by using a speed signal compared against zero speed as an error signal to drive the locomotive to zero speed at a controlled rate of braking effort. When the speed is reduced to zero, the regulator functions to maintain zero speed thereby effectively providing a controlled stop function without use of mechanical braking.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
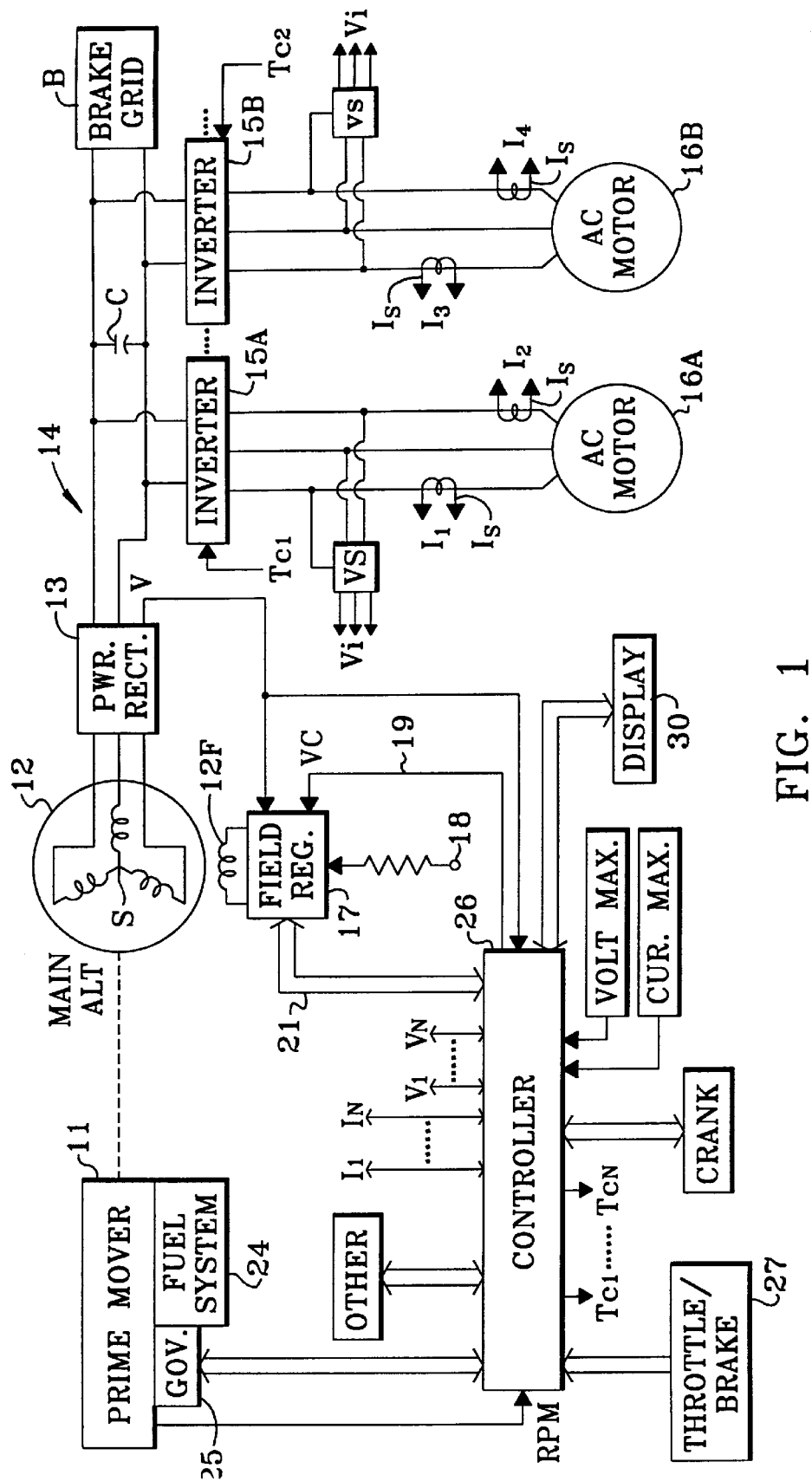
FIG. 1 is a functional block diagram of a synchronous generator propulsion system with which the present invention may be used.

A propulsion system with which the present invention may be used is shown in FIG. 1 and includes a variable-speed prime mover 11 mechanically coupled to the rotor of a dynamoelectric machine 12 comprising a 3-phase alternating current (AC) synchronous generator, also referred to as a main traction alternator. The main alternator 12 has a set of three Y-connected armature windings on its stator. In operation, it generates 3-phase voltages in these windings, which voltages are applied to AC input terminals of at least one 3-phase, full-wave uncontrolled power rectifier bridge 13. In a conventional manner, the bridge 13 is formed by a plurality of pairs of power diodes, two or three such pairs being associated with each of the three different phases of the main alternator 12. The diodes in each pair are serially connected between relatively positive and negative direct current (DC) output terminals of the rectifier bridge, and their junction is connected via a protective fuse (not shown) to the respectively associated AC input terminal of the bridge. The output of the bridge 13 is electrically coupled, via a DC link 14, in energizing relationship to a plurality of parallel-connected inverters 15, two of which are shown at 15A, 15B coupled to provide AC power to a respective one of a corresponding plurality of adjustable speed AC traction motors 16, two of which are shown at 16A, 16B.

A DC link filter capacitor C minimizes transient voltage variations and stabilizes DC voltage on the link 14. Prime mover 11, alternator 12, and rectifier 13 are suitably mounted on the platform of a self-propelled traction vehicle which typically is a 4-axle or 6-axle diesel-electric locomotive. The locomotive platform is in turn supported on two trucks (not shown), each having two or more axle-wheel sets. A separate traction motor is hung on each axle, and its rotor is mechanically coupled via conventional gearing in driving relationship to the associated axle-wheel set. Suitable current sensing means $I_s$ are used to provide a family of current feedback signals $I_1$, $I_2$, $I_N$ that are respectively representative of the magnitudes of the motor currents in at least two phases of each motor, the current in the third phase being the algebraic sum of the currents in the measured phases. In addition, voltage sensors $V_s$ provide signals representative of the phase to negative voltage $V_i$ for each phase of each motor.

The main alternator 12 and the power rectifier 13 serve as a controllable source of electric power for the respective traction motors. The magnitude of output voltage (or current) of this source is determined and varied by the amount of excitation current supplied to field windings 12F on the rotor of the main alternator. These field windings are connected for energization to the output of a suitable source 17 of regulated excitation current $I_F$.

Preferably, the excitation current source 17 comprises a 3-phase controlled rectifier bridge, the input terminals 18 of which receive alternating voltages from a prime mover-driven auxiliary alternator that can actually comprise an auxiliary set of 3-phase armature windings on the same frame as the main alternator 12. The source 17 is labeled "Field Regulator" in FIG. 1. It includes conventional means for varying the magnitude of direct current IF supplied to the alternator field 12F (and hence the output of the alternator 12) as necessary to minimize any difference between the value of a variable control signal VC on an input line 19 and a feedback signal which during motoring is representative of the average magnitude V of the rectified output voltage of the main alternator 12. The latter voltage magnitude is a known function of the magnitude of excitation current in the field windings 12F and the magnitude of output current in the armature windings of the main alternator, respectively, and it also varies with the speed of the prime mover 11. It is sensed by a conventional voltage sensing module connected across the DC output terminals of the power rectifier.

The prime mover 11 that drives the alternator field 12F is a thermal or internal-combustion engine or equivalent. On a diesel-electric locomotive, the motive power is typically provided by a high-horsepower, turbocharged, 16-cylinder diesel engine. Such an engine has a fuel system 24 that includes a pair of fuel pump racks for controlling how much fuel oil flows into each cylinder each time an associated fuel injector is actuated by a corresponding fuel cam on the engine camshafts. The position of each fuel rack, and hence the quantity of fuel supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed call signal received from an associated controller 26, which signal is herein called the speed command signal or the speed call signal. An engine speed signal (RPM) indicates the actual rotational speed of the engine crankshaft and hence of the alternator field.

The speed command signal for the engine governor system 25 and the excitation control signal VC for the alternator field current source 17 are provided by the controller 26. In a normal motoring or propulsion mode of operation, the values of these signals are determined by the position of a handle of a manually operated throttle 27 to which the controller 26 is electrically coupled. A locomotive throttle conventionally has eight power positions or notches (N), plus idle and shutdown. N1 corresponds to a minimum desired engine speed and power, while N8 corresponds to maximum speed and full power. With the throttle in its idle position, the controller 26 is operative to impose on the control signal VC a value corresponding to IF=O, and no traction power is produced by the main alternator 12. When dynamic braking of a moving locomotive is desired, the operator moves the throttle handle through its idle position and into an opposite braking position so that the main controller 26 is now supplied with a variable "brake call" signal that will determine the value of the alternator excitation control signal VC.

For each power level of the engine there is a corresponding desired load. The controller 26 is suitably arranged to translate the notch information from the throttle 27 into a reference signal value substantially equal to the value that the voltage feedback signal V will have when the traction power matches the called-for power, and so long as the alternator output voltage and load current are both within predetermined limits, the control signal VC on the input line 19 of the excitation current source 17 is varied as necessary to obtain this desired link voltage. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine.

As is illustrated in FIG. 1, the controller 26 receives the above-mentioned engine speed signal RPM, voltage feedback signal V, and current feedback signals I1, I2, etc. which are representative, respectively, of the magnitudes of current in the individual traction motors, and voltage feedback signals $V_i$ (where I is 1 to N and N is three times the number of motors 16) representative of motor phase voltage. The controller computes power delivered to the motors from measured voltage and current. It also receives a load control signal issued by the governor system 25 if the engine cannot develop the power demanded and still maintain the called-for speed. The load control signal is effective, when issued, to reduce the power reference value in the controller 26 so as to reduce traction motor torques. Additional data supplied to the controller 26 includes: "VOLT MAX" and "CUR MAX" data that establish absolute maximum limits for the alternator output voltage and current, respectively; "CRANK" data indicating whether or not an engine starting (i.e., cranking) routine is being executed; and relevant inputs from other selected sources, as represented by the block labeled "OTHER." The alternator excitation source 17 and the controller communicate with each other via a multi-line serial data link or bus 21.

For the purpose of responding to faults in the propulsion system, the controller 26 is supplied with various feedback signals as described above whose values may vary with the magnitude of the monitored characteristic, e.g., speed, current and voltage. If signals indicate that a characteristic is abnormally high or low, the controller automatically executes certain protective functions and, at the same time, sends appropriate messages or alarm signals to a display module 30 in the cab of the locomotive. For example, the ground fault protective functions implemented by the controller 26 is effective to modify the value of the control signal VC on line 19 when ground leakage current is abnormally high so that (1) if the ground current magnitude is in a range between a predetermined deration threshold level and a predetermined maximum permissible limit, the magnitude of alternator field current IF is reduced and consequently the power output of the main alternator 12 is reduced to a fraction of its normally desired amount, which fraction varies inversely with the magnitude of ground current in excess of the deration threshold level, and (2) the power output is restricted to zero for at least a minimum interval of time if the ground current magnitude increases above its maximum limit.

In the preferred embodiment of the prevent invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, a central processing unit (CPU) executes an operating program stored in an erasable and electrically reprogrammable read only memory (EPROM) which also stores tables and data utilized in the program. Contained with the CPU are conventional counters, registers, accumulators, flipflops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses.

The controller 26 is programmed to produce, in the motoring mode of operation, a control signal value on the line 19 that varies as necessary to zero any error between the value of the alternator voltage feedback signal V and a reference value that normally depends on the throttle position selected by the locomotive operator and locomotive speed. In order to implement an electrical braking mode of operation, the controller 26 is programmed to vary the value of the control signal VC as necessary to zero any error between DC link volts and a fixed braking voltage reference.

Figure 2:
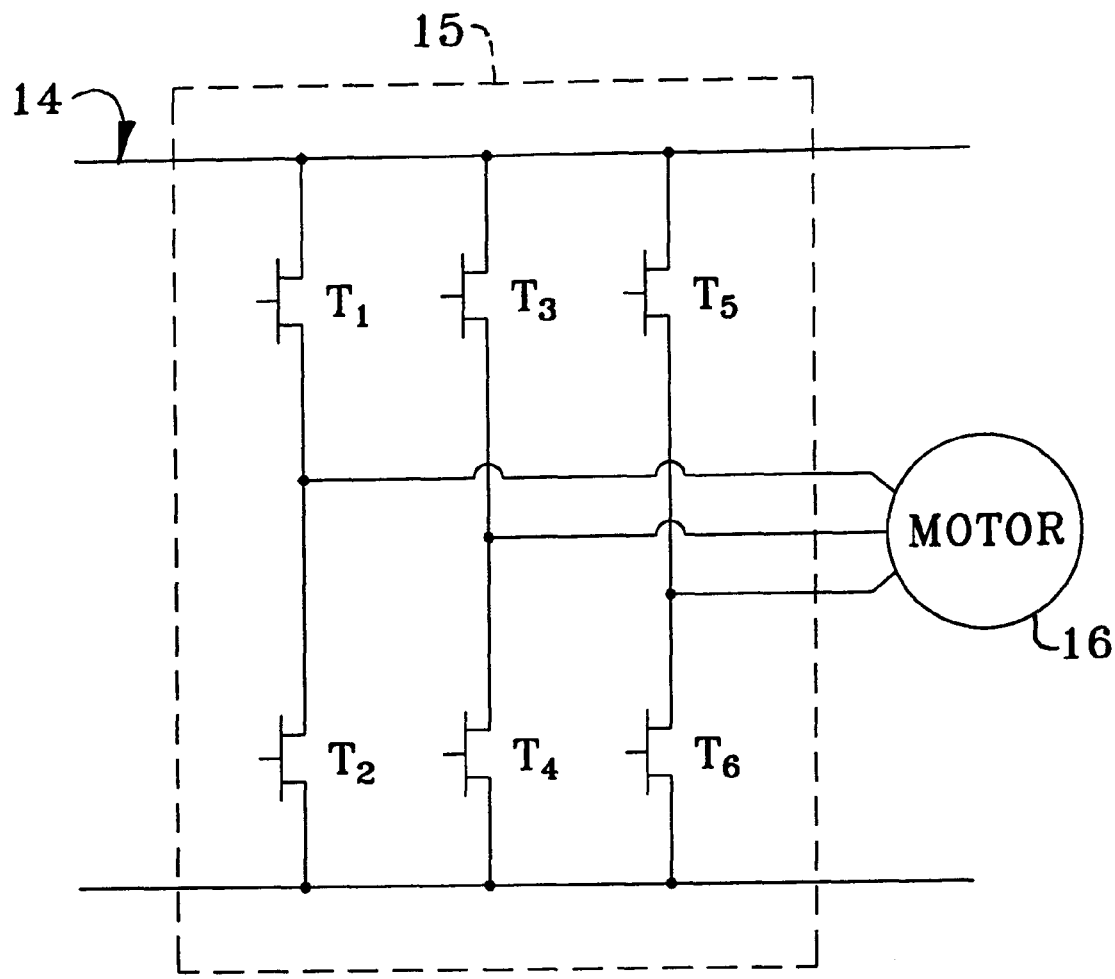
FIG. 2 is a simplified schematic representation of one form of inverter circuit.

As is well known, the inverters 15 are each constructed of a plurality of controllable switching devices arranged in the form shown in FIG. 2. Various forms of inverters are known in the art and FIG. 2 illustrates only a simplified schematic representation of one such form. Each inverter 15 uses at least six switching devices T connected in serial pairs across the DC link 14 to produce controlled frequency AC voltage for application to each phase of the 3-phase motors 16. The amount of electrical power supplied to the motors 16 is regulated by controlling the time duration of conduction of each of the switching devices T during each phase of operation in a well known manner. The devices T may be operated in a pulse width modulated (PWM) to regulate power and control switching transients. Motor torque is controlled by a combination of control of pulse duration and excitation frequency. Pulse duration establishes flux while excitation frequency controls the slip frequency. During electrical braking, the motors 16 act as generators with their rotors being turned by kinetic energy from the rotating wheels of the vehicle. The inverters 15 are operated, by phase control switching of the devices T, to regulate the magnitude of braking effort by controlling the amount of current transferred to the electrical braking grid B coupled to the DC link 14. As is known, the inverters 15 can transfer power bi-directionally, i.e., either to or from the inverters 15. At very low vehicle speeds, braking effort requires that motor flux be established by applying voltage to the motors from the DC link 14. Thus, some power is transferred to the motors 16 at low speed in order to overcome losses in the motor. However, net power, i.e., torque times speed minus losses, is in a direction to create braking effort down to about zero speed of the vehicle. Accordingly, by controlling the conduction timing of the switching devices T in the inverters 15, it is possible to establish braking effort down to zero speed. The present invention combines the braking effort control function into a speed regulator which can be used to hold a vehicle at zero speed once the vehicle has been stopped.

Figure 3:
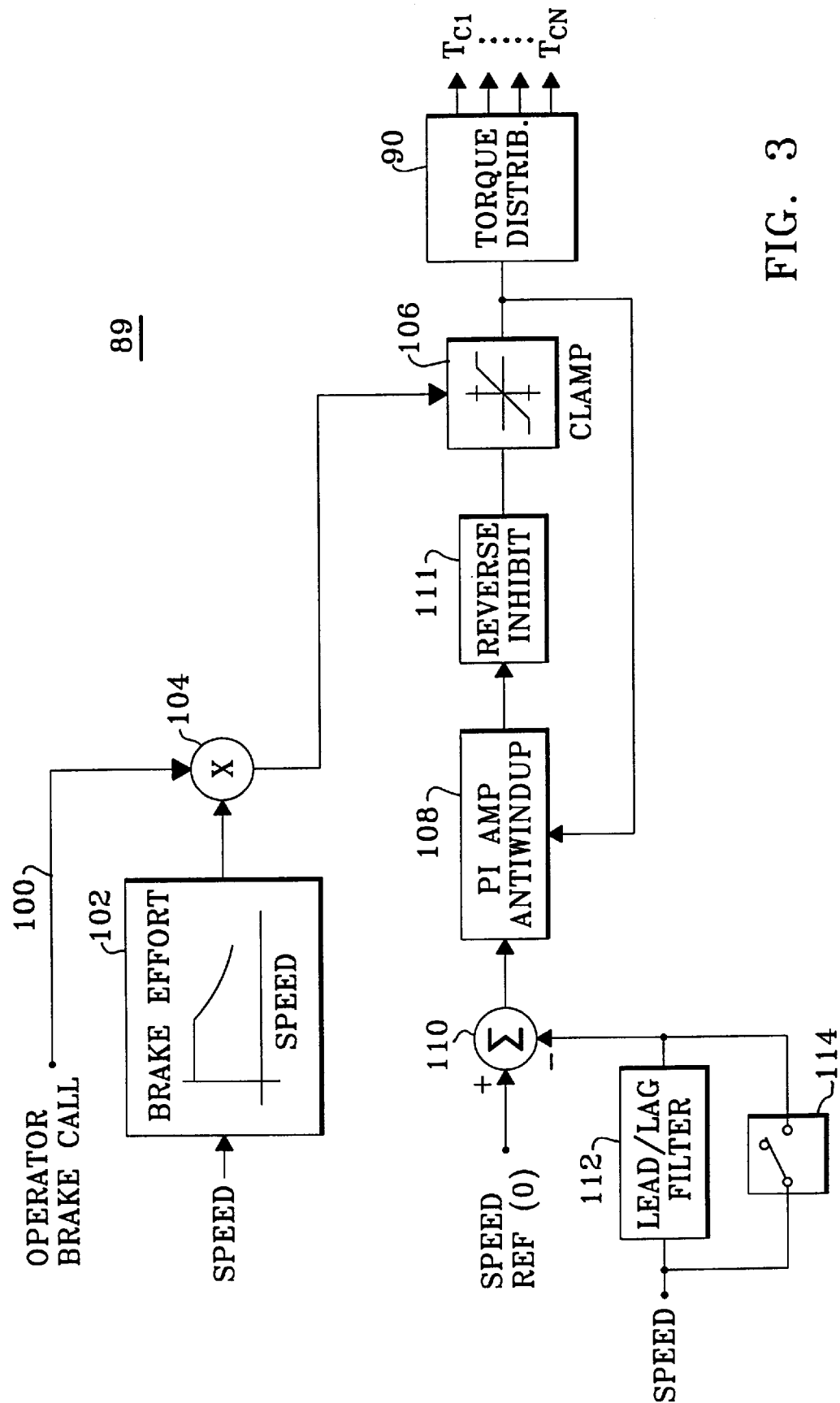
FIG. 3 is a simplified block diagram of a speed regulator/braking effort controller in accordance with one teaching of the present invention.

FIG. 3 illustrates, in block diagram form, one implementation of a speed regulator/braking effort controller 89 of the present invention. While shown as blocks as though implemented in analog circuit form, it will be appreciated that the system of FIG. 3 is preferably implemented by computer program within the controller 26 of FIG. 1. Further, the controller 26 implements the program forming the function of FIG. 3 in response to an operator call for electrical braking. The system of FIG. 3 generates, as represented by block 90, torque command signals $T_{C1}$–$T_{CN}$, one signal for each inverter, which signals control the respective inverters in a conventional manner to establish a selected frequency of current in the windings of the associated motor. The torque command signals are shown in FIG. 1 as outputs of controller 26 applied to each inverter 15 and may be the actual device gating signals generated in controller 26 or signals effective to generate gating signals in a local processor associated with each inverter. When the locomotive operator initiates a brake call command by moving the speed control throttle to a selected braking position, a command is placed on line 100 which establishes the percent of maximum available braking that will be utilized. For example, if full braking is desired, the command on line 100 will represent 100%; however, if half braking is desired, the command on line 100 will represent 50%. The maximum available braking is determined by block 102 as a function of speed in a conventional manner. For speeds above motor breakover, the braking effort curve follows a constant horsepower profile. For speeds below motor breakover, the braking effort follows a constant torque profile. The braking effort value, varying with speed, is supplied to junction 104 where it is multiplied by the brake call command percentage. If full braking effort is desired, the braking effort value is essentially multiplied by 1 and is therefore not changed. The value of braking effort is coupled to a clamp block 106 and used to set the maximum allowable output values of block 106 to the maximum available braking effort as modified by the operator command call.

The value of braking effort, within the limits set by the block 102 and operator braking call signal, is established by a conventional type of proportional plus integral (PI) control circuit indicated by block 108 as a function of vehicle speed. A signal derived from a tachometer or other vehicle speed indicating device is coupled to a summing junction 110, where the speed signal is algebraically summed with the value of a reference signal. For braking and for maintaining a controlled stop, the reference signal is set at zero. Accordingly, the speed error signal from junction 110 is the same as the speed signal. The speed error signal is coupled to the PI circuit 108 which circuit operates in a conventional manner using feedback from block 106, to produce an error signal having a value to drive the vehicle speed toward the reference value, i.e., towards zero, by commanding a particular motor torque value. The intermediate block 111 between the Pi circuit 108 and clamp 106 represents a circuit or function for preventing polarity reversal of the torque command from circuit 108 until the vehicle speed signal indicates a direction change, i.e., the block 111 prevents motoring torque (opposing torque) until the speed changes sign. This speed can be set to a very small value such as, for example, 0.1 MPH. Block 111 may not be necessary or desirable in all applications.

Since the speed error signal for braking is the difference between actual speed and zero, the value of the error signal from PI circuit 108 will integrate to a relatively high value during braking of the vehicle until a relatively low speed is reached. Consequently, the error signal will generally drive the clamp circuit of block 106 into one of its upper or lower limit values as set by block 102 and the operator brake call signal. Since the output value of clamp circuit 106 is limited, normal operation of PI circuit 108 would tend to drive the circuit 108 output signal to a high value until the active driver devices, e.g., transistors, become saturated which saturation delays the response time of the circuit, i.e., it may take a long time for the circuit to recover when the error signal goes to zero. In order to avoid this phenomenon, PI circuit 108 includes an anti-windup function which prevents saturation during the time that clamp circuit 106 limits the magnitude of the torque command. In the case of computer circuits, saturation is not an issue but if no anti-windup is provided, it may take a long time for the output of the integrator 108 to come down from a large value to values within normal operation range when the error signal goes to zero. This may take a long time depending on the magnitude of the PI circuit output.

As can be seen in FIG. 3, the locomotive or vehicle speed signal is coupled to a lead-lag filter 112 and the output of the filter 112 is coupled to summing junction 104 for supplying the speed signal. When electrical braking is commanded and the vehicle speed is above a selected set point, e.g., about 3 MPH, the filter 112 can be bypassed by a switch 114 so that the filter has no effect on the speed signal. As a result, the torque command cannot reverse during emergency braking, i.e., when mechanical brakes are also applied, at which time the braking rate could exceed the normal rate and cause a torque reversal through filter 112 action. Below about 3 MPH, the switch 114 opens forcing the speed signal through the filter 112. The filter 112 has a lead characteristic which reduces the speed signal magnitude to zero prior to vehicle speed reaching zero, i.e., the filter 112 responds both to signal magnitude and rate of change. It will be appreciated that the system will operate without switch 114 although its use makes the braking action feel more like conventional electric retarding at higher speeds.

Once the vehicle has reached zero speed, the control circuit of FIG. 3 acts as a speed regulator to provide a controlled stop function. More particularly, the filtered speed signal from filter 112 is continuously monitored and compared to the zero speed reference at junction 110. Any error signal from junction 110 generates a torque command signal of a polarity to minimize the error. The torque command signal is distributed to the control circuits for each of the inverters to energize the associated motors in a manner to reduce the speed error to zero thereby holding the vehicle in position. The filter 112 smoothes the speed signal to prevent jogging of the vehicle which could occur if the speed were applied directly to junction 110.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed:

1. A controlled stop system for an AC electric traction motor propelled vehicle, the vehicle including at least one inverter coupled between a DC link and at least one AC motor, a control means responsive to a braking effort command for controlling the conduction timing of each of a plurality of switching devices forming an operative function of the inverter wherein the conduction timing of the switching devices is effective to control the magnitude and direction of power flow between the DC link and the motor, the system comprising:

a braking effort control circuit responsive to a braking command for establishing a conduction timing pattern of the switching devices in the inverter to regulate braking effort produced by the motor, said control circuit including means responsive to a vehicle speed signal for adjusting the switching device conduction timing pattern to maintain braking effort to about zero speed; and filter means for processing the vehicle speed signal before application to said braking effort control circuit wherein said control circuit operates as a speed regulator at zero speed to maintain the vehicle in a stopped condition.

2. The system of claim 1 and including switching means for disabling operation of said filter means when the vehicle is operating at speeds above a selected minimum speed.

3. The system of claim 1 and including an inhibit circuit for preventing application of motoring torque during braking until vehicle speed changes sign.

4. The system of claim 2 wherein said control circuit comprises a proportional plus integral error amplifier responsive to the speed signal and a clamp circuit for limiting an output of said error amplifier to a maximum allowable braking effort as a function of vehicle speed.

5. The system of claim 4 wherein said error amplifier is a feedback control amplifier and is connected for receiving a feedback signal from an output of said clamp circuit, said amplifier further including an anti-windup circuit for preventing amplifier saturation when said clamp circuit output is clamped to said maximum allowable braking effort.

6. A method for holding an electric motor propelled vehicle in a controlled stop position, the vehicle having at least one alternating current (AC) electric traction motor coupled in driving relationship to at least one wheel thereof, a direct current (DC) source for supplying DC power over a DC link, a braking circuit selectively connectable to the DC link, a bi-directional inverter coupled between the DC link and the motor, and a controller coupled to the inverter and operable to control the inverter in a manner to establish operation of the motor in accordance with an operator's command, the method including the steps of:

operating the inverter in response to a braking command so as to transfer electric power from the motor through the inverter to the braking circuit until the vehicle has stopped moving;

monitoring vehicle speed while the vehicle is in a stopped condition to detect movement thereof;

generating an error signal proportional to the monitoring vehicle speed; and applying the error signal to the controller to generate a motor torque command having a polarity to drive the vehicle in a direction to minimize the vehicle speed whereby the vehicle is held in the stopped condition.

7. The method of claim 6 and including the steps of generating a speed signal representative of vehicle speed and direction and passing the speed signal through a lead/lag filter.

8. The method of claim 7 and including the step of bypassing the speed signal around the filter when vehicle speed is greater than about 3 miles per hour.

9. In a control system for an AC electric traction motor propelled vehicle, the vehicle including at least one inverter coupled between a DC link and at least one AC motor, a control means responsive to a braking effort command for controlling the conduction timing of each of a plurality of switching devices forming an operative function of the inverter wherein the conduction timing of the switching devices is effective to control the magnitude and direction of power flow between the DC link and the motor, the improvement comprising a braking effort control means which smoothly transitions to a speed regulator including:

means for establishing a maximum braking effort command as a function of vehicle speed;

clamping means responsive to said braking effort command for limiting the maximum value of torque to be produced by the motor;

a proportional plus integral error amplifier responsive to a speed error signal for developing a torque command for application to said clamping means; and means for developing said speed error signal from a measured value of vehicle speed, wherein said speed error signal is obtained as a difference between measured speed and zero speed to thereby brake the vehicle speed to zero and hold speed at zero by applying the speed error signal to control motor torque.

10. The improvement of claim 9 and including a lead/lag filter for filtering said speed signal when vehicle speed is less than about 3 miles per hour.

11. The improvement of claim 9 and including a reverse inhibit circuit for preventing torque reversal until speed changes sign.

* * * * *